No. 887,565. PATENTED MAY 12, 1908.
A. ZUBERBÜHLER.
APPARATUS FOR MOLDING ARTICLES FROM CEMENTITIOUS MATERIAL.
APPLICATION FILED NOV. 24, 1906.

4 SHEETS—SHEET 1.

WITNESSES: INVENTOR.
Alexander Zuberbühler
BY
ATTORNEYS

No. 887,565. PATENTED MAY 12, 1908.
A. ZUBERBUHLER.
APPARATUS FOR MOLDING ARTICLES FROM CEMENTITIOUS MATERIAL.
APPLICATION FILED NOV. 24, 1906.

4 SHEETS—SHEET 4.

WITNESSES:
INVENTOR.
Alexander Zuberbuhler
BY
ATTORNEYS

UNITED STATES PATENT OFFICE.

ALEXANDER ZUBERBUHLER, OF TORONTO, ONTARIO, CANADA.

APPARATUS FOR MOLDING ARTICLES FROM CEMENTITIOUS MATERIAL.

No. 887,565.          Specification of Letters Patent.          Patented May 12, 1908.

Application filed November 24, 1906. Serial No. 344,852.

*To all whom it may concern:*

Be it known that I, ALEXANDER ZUBER-BUHLER, of the city of Toronto, in the Province of Ontario, Canada, have invented certain new and useful Improvements in Apparatus for Molding Articles from Cementitious Material, of which the following is a specification.

My object is to devise simple, effective and expeditious means for molding various articles from cementitious materials, and particularly from concrete.

It is well known that concrete when filled into a mold has a tendency to form arches in the material, particularly in narrow and deep molds, which prevents the proper solidifying and compacting of the material. I overcome the difficulty by closing the mold after it has been filled, and by causing the bottom to approach the top of the mold, thus compacting and solidifying the mass by pressure from below which tends to break up the arches as these have no strength to resist such upward pressure. The apparatus by which I accomplish this result is hereinafter more specifically described, and then definitely claimed.

Figure 1:
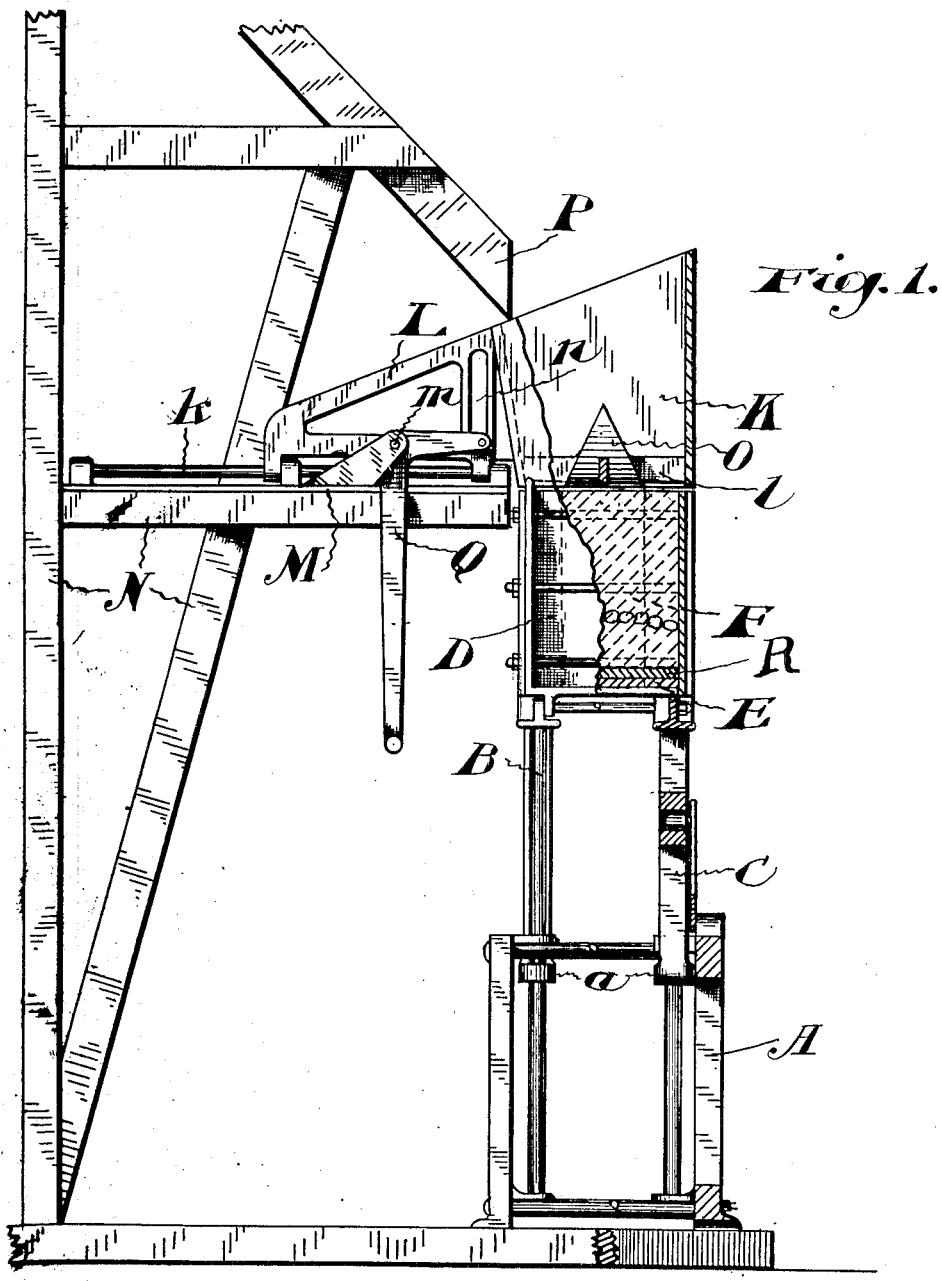
Figure 2:
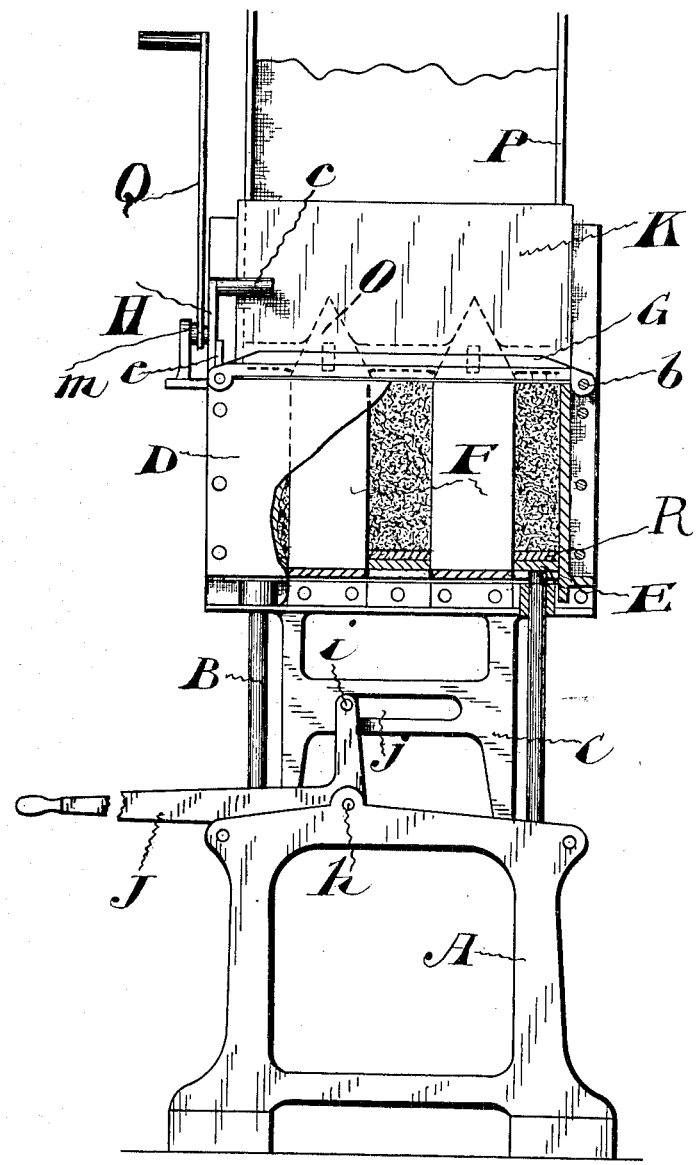
Figure 5:
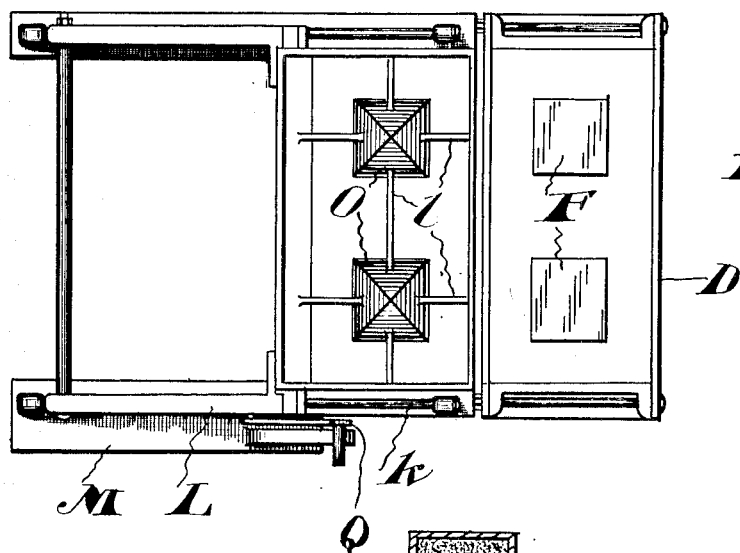
Figure 7:
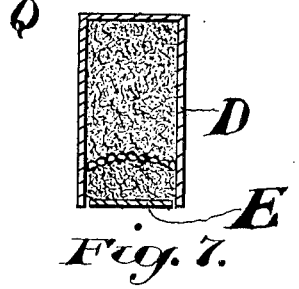
Figure 8:
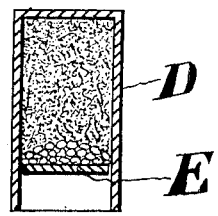
Figure 9:
Figure 4:
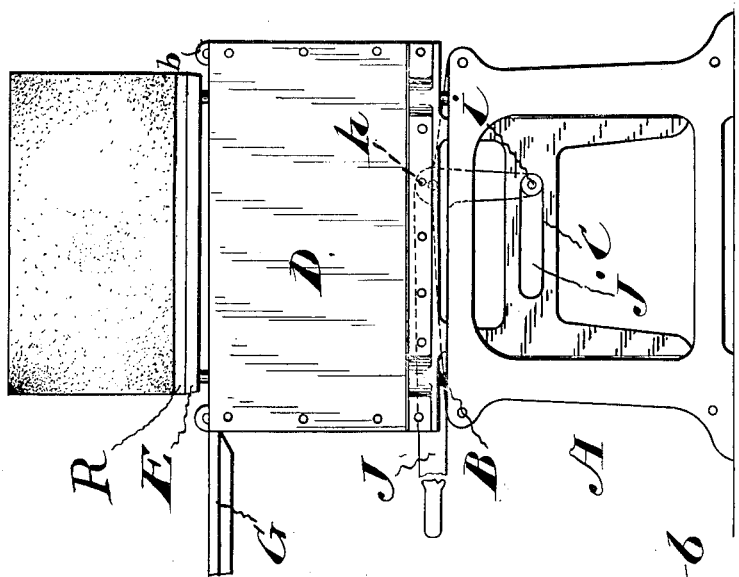
Figure 6:
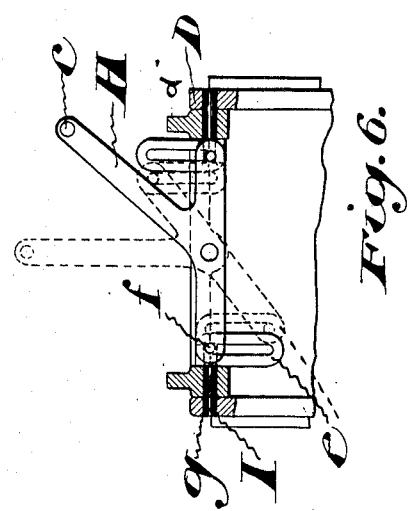
Figure 5:
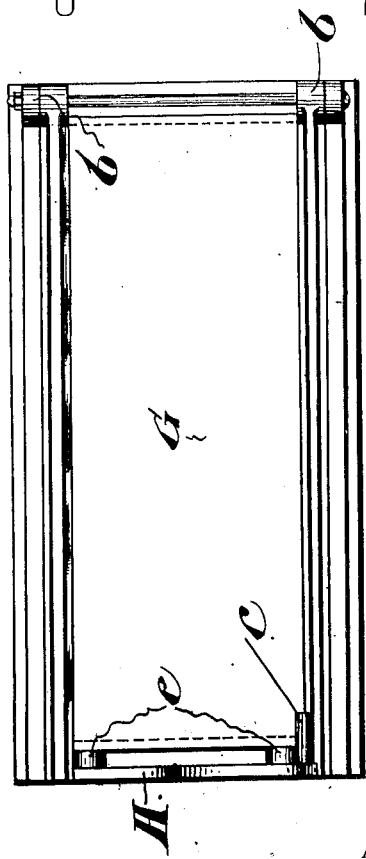

Figure 1 is a side elevation, partly in section, of my improved apparatus. Fig. 2 is a front elevation, partly in section, with the mold cover closed. Fig. 3 is a plan view of the apparatus with the filler slid back showing the mold with its cover open. Fig. 4 is a front elevation of the apparatus with the mold lowered to free it from the molded article. Fig. 5 is a plan view of the mold with the cover closed. Fig. 6 is an end elevation, partly in section, showing the locking means for the mold cover. Fig. 7 is a diagrammatical view of a mold before compression of a block. Fig. 8 is a similar view after compression. Fig. 9 is a diagrammatical view illustrating the formation of an arch and how it may be broken up by pressure from below.

In the drawings like letters of reference indicate corresponding parts in the different figures.

A is a stand suitably shaped to support a plurality of vertical guide rods B.

C is a frame adapted to slide on these guides by means of the lugs $a$ through which the guide rods pass. To the upper end of this frame is secured a mold D, of any desired shape and size, preferably formed of metal, or wood lined with metal.

E is a loose mold bottom, either of wood or metal or wood and metal combined, which rests upon the upper ends of the guide rods B. A pallet R separate from the bottom may also be employed.

If cores F are to be used in molding the article for the purpose of producing hollow spaces therein these will be supported on the frame C, as shown, and secured thereto in any suitable manner. When cores are employed it is of course necessary to provide apertures in the bottom E through which the cores may project into the interior of the mold.

The mold is provided with a cover G hinged at $b$ at one side of the mold. At the other end of the cover is fulcrumed a T-lever H, provided with a suitable handle $c$. Bolts I are longitudinally slidable in lugs $d$ formed on the cover, and are provided with slotted arms $e$ extending in opposite directions, as shown. (See Fig. 6.) With the slots in these arms are engaged the pins $f$ from the ends of the head of the T-lever. Holes $g$ are provided in a suitable part of the end of the mold into which the bolts I may be shot by rocking the T-lever.

In Fig. 6 I show the parts in full lines with the bolts shot home to lock the cover. In dotted lines the parts are shown as they appear when the bolts are withdrawn to release the cover.

The frame C is vertically movable on the guide rods B by means of a bent lever J fulcrumed at $h$ on the stand A. The end of this lever is provided with a projection $i$, preferably formed as a small roller which enters a substantially horizontal slot $j$ in the frame. By operating this lever the mold may be raised and held in the position shown in Fig. 2, or allowed to drop to the position shown in Fig. 4.

With the mold is associated a filler. This is formed of a bottomless box K, which is provided with rearwardly extending arms L, provided with lugs adapted to slide on the horizontal guide rods $k$ secured to a table M supported by suitable frame work N. If the filler is to be used with a mold provided with cores a guide or deflector O will be provided over each core connected by means of suitable arms $l$ to the sides of the box. These guides or deflectors direct the cementitious material into the molds and prevent it lodging on the tops of the cores. Above the box of the filler, when the latter is in position over the mold, is the lower end of a chute or hopper P, by means of which cementitious material may be fed into the filler. The filler is operated by means of a bent lever Q fulcrumed on the table M at m, and provided with a projection preferably formed as a small roller, which enters a substantially vertical slot n formed in one of the rearwardly extending arms L of the filler. By operating this lever Q the filler may be moved to the position shown in Fig. 1, or else withdrawn over the table, as shown in Fig. 3.

The operation of the device is substantially as follows;—The concrete falls from the chute or hopper P through the bottomless box K into the mold D and fills the latter. The lever Q is then operated to withdraw the bottomless box into the position shown in Fig. 3. By this movement all superfluous material is scraped from the top of the mold and carried back onto the table M. The cover G of the mold is then closed and locked in the manner already described. The operator then begins to move the lever J from the position shown in Fig. 2. The support is then withdrawn from the mold D since it is dependent on the support of the projection i of the said lever to hold it in place. The weight of the mold now causes it to move downward until the material is thoroughly solidified.

It will be seen that although it is the mold which moves while the mold bottom is held stationary the effect is the same as if the reverse were the case, as the cementitious material or concrete is pushed up from below by the upward movement of the bottom, relative to the sides and cover of the mold. This effectually breaks up any arches which may have formed in the material and causes an equal condensation and solidification of the whole mass throughout its bulk. When the material has sufficiently set the cover G is opened, and the mold D continuing its downward movement liberates the finished article, which is shown as a block of building material. The block may now be carried away on the bottom E and a new bottom placed in position ready for the molding of the next block. The parts may now be returned to their normal position by reversing the movements already described.

It is understood, of course, that during the operation of molding any suitable reinforcement for the block may be placed in the molds without interfering in any way with the operations already described. The downward sliding of the mold when liberating the block smoothes the sides of the same and gives them a finished and handsome appearance. By the use of my apparatus a complete block, or other article, thoroughly compact throughout, and of finished appearance, is turned out with a minimum of labor.

While I have described what I deem the best construction for my purpose, it is evident that many changes can be made in the details of construction without departing from the spirit of my invention.

What I claim as my invention is:

1. In apparatus for molding articles from cementitious material, the combination of a vertically movable mold; a stationary bottom; a removable cover for the mold; means for locking the cover on the mold; and means for holding the mold in its normal position and for permitting it to drop down therefrom, substantially as described.

2. In apparatus for molding articles from cementitious material, the combination of a mold; a removable cover hinged thereon; a mold bottom; means for locking the cover on the mold; means for effecting an upward movement of the bottom relative to the cover to compress the molded article from below; and means for imparting a vertical movement to the mold to free it from a molded article, substantially as described.

3. In apparatus for molding articles from cementitious material, the combination of stationary vertical guide rods; a frame movable on the guide rods; a mold carried by said frame; and a removable mold bottom supported on the upper ends of the guide rods, substantially as described.

4. In apparatus for molding articles from cementitious material, the combination of stationary vertical guide rods; a frame movable on the guide rods; a mold carried by said frame; a removable mold bottom supported on the upper ends of the guide rods; a removable cover for the mold; and means for locking it in place on the mold, substantially as described.

5. In apparatus for molding articles from cementitious material, the combination of stationary vertical guide rods; a frame movable on the guide rods; a mold carried by said frame; a removable mold bottom supported on the upper ends of the guide rods; a bent lever fulcrumed on a stationary part; and a pin and slot connection between the lever and the frame, substantially as described.

6. In apparatus for molding articles from cementitious material, the combination of a mold; a cover hinged thereon; a T-lever fulcrumed on the cover; bolts slidably carried on the cover; pin and slot connections between the T-lever and the bolts whereby they may be moved longitudinally, the mold being provided with openings into which the bolts may be projected to lock the cover, substantially as described.

7. In apparatus for molding articles from cementitious material, the combination of vertical guide rods; a frame movable on the guide rods; a mold carried by said frame; a removable cover therefor; means for locking the cover on the mold; a removable mold bottom supported on the upper ends of the guide rods; a bent lever fulcrumed on a stationary part; and a pin and slot connection between the lever and the frame, substantially as described.

Toronto, Ont., 20th November, 1906.

ALEXANDER ZUBERBUHLER.

Signed in the presence of—
J. EDW. MAYBEE,
JOHN G. RIDOUT.